Patented June 8, 1926.

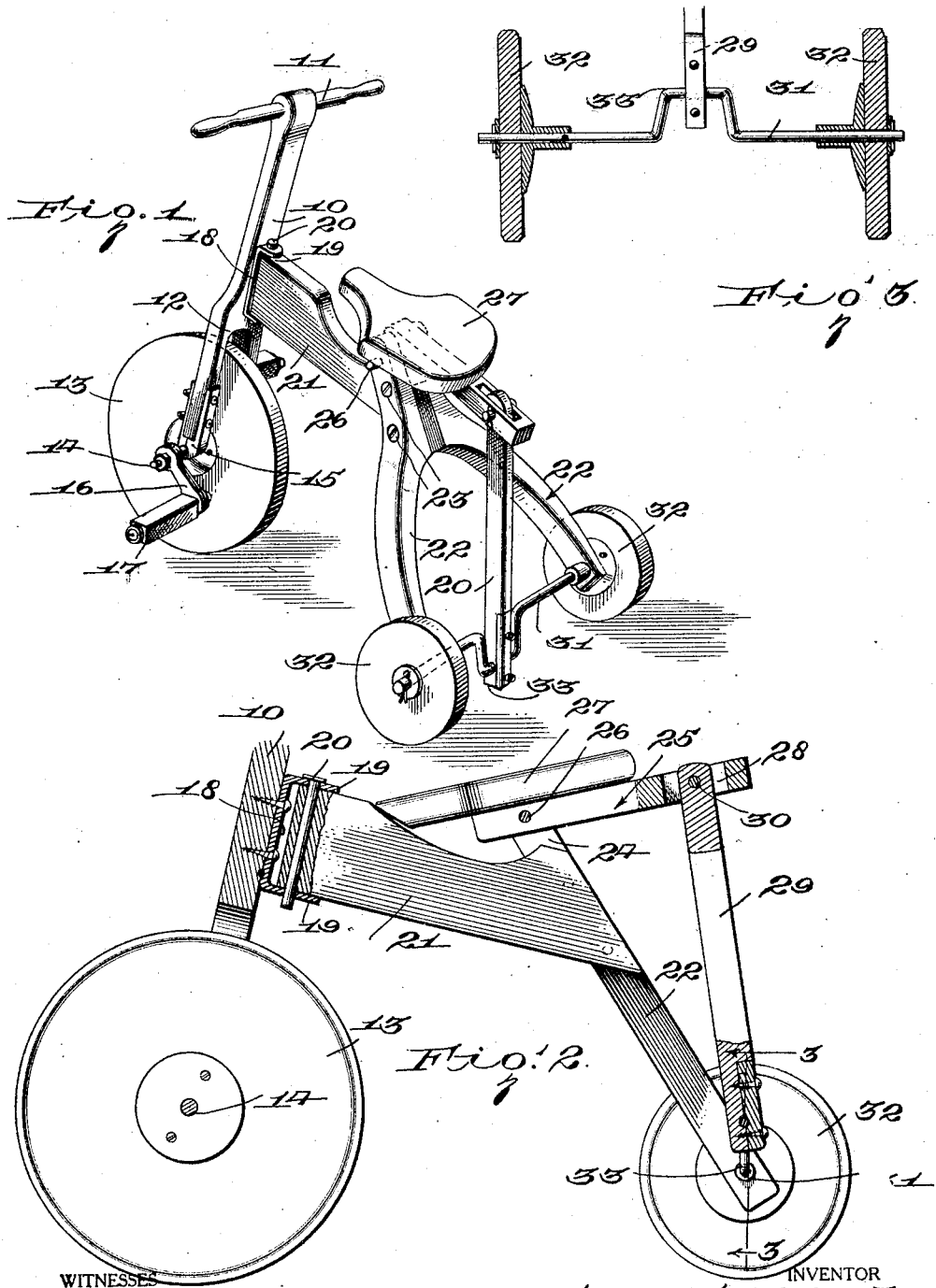

1,587,930

UNITED STATES PATENT OFFICE.

PETER P. WETZEL, OF WAYNESBORO, VIRGINIA.

CHILD'S VEHICLE.

Application filed January 7, 1926. Serial No. 79,838.

My present invention relates generally to wheeled vehicles, and more particularly to children's vehicles, my object being the provision of a child's vehicle which may be propelled by the feet, and which embodies certain features operable during movement of the vehicle which will be amusing and attractive to children in general.

A further and more specific object is the provision of a child's vehicle of the type above specified having a rocking seat and connections actuated by movement of the vehicle to continuously rock the seat during such movement.

In the accompanying drawing which illustrates my present invention and forms a part thereof:—

Figure 1 is a perspective view showing my improved child's vehicle;

Figure 2 is a side view of a portion thereof partly in elevation and partly broken away and in section, and, Figure 3 is a vertical transverse section taken substantially on line 3—3 of Fig. 2.

Referring now to these figures, my invention proposes a vehicle of the type specified having a forward generally upright and slightly inclined steering post 10 provided at its upper end with a transversely disposed handle 11, and having at its lower portion wheel forks 12 adapted to straddle the upper portion of a single front combined steering and propelling wheel 13. This wheel 13 has an axial shaft 14, which is journaled through bearing members 15 clamped to the lower ends of the forks 12 and which is provided upon its outer ends with cranks 16 to the latter of which pedal and pedal supports 17 are connected so that the vehicle as a whole may thus be foot-propelled in use.

The steering post is further provided at a point intermediate its ends with a bracket 18 having upper and lower rearwardly projecting ears 19 apertured for the reception of a king pin 20. This pin extends vertically through the main frame bar 21, which inclines rearwardly and downwardly from the steering post and to the rear end of which are secured the upper ends of a pair of downwardly and rearwardly inclined and divergent legs 22. The connections between the upper ends of the legs 22 and the rear end of the frame bar 21 preferably includes bolts 23, this connection being a rigid one, and the legs are preferably secured with portions or extensions 24 projecting above the frame bar 21 to receive between these extensions a rearwardly projecting seat bar 25. This bar is pivotally connected by a horizontal pivot pin 26, extending through the upper extensions 24 of the legs, so that the seat bar 25 may thus swing upwardly and downwardly on the pivot pin 26.

Upon the seat bar 25 the seat 27 is securely fastened in any suitable manner preferably with its central portion above the pivot pin 26, and to the rear slotted end 28 of the seat bar 25 there is pivotally connected the upper end of a connecting bar 29, the pivot between these members being connected at 30.

Journaled through the lower rear ends of the legs 22 is a rear axle 31, upon the outer ends of which are securely fastened ground wheels 32. This rear axle has at its central point a crank 33, and to this crank is movably connected the lower end of the connecting bar 29. Thus the seat 27 is adapted to rock by virtue of the upper upward and downward swinging movements of the seat bar 25 and continuous rocking movement will be imparted to this seat in the operation of the vehicle by virtue of the crank and pitman connection between the rear constantly rotating axle 31 and the rear end of the seat bar 25.

It is obvious that in use the child seated upon the seat 27 may propel the vehicle by foot pressure against the pedals 17 and it is furthermore obvious that by grasping the handle 11 the vehicle may be readily steered through movements of the steering post 10 upon the king pin 20 serving as a movable connection between this post and the frame bar 21.

I claim:—

A child's vehicle comprising a steering post having an upper handle and lower wheel forks, a ground wheel journalled in said forks and having side cranks and foot pedals, a frame bar pivotally connected at its forward end to said steering post intermediate the ends of the latter, said frame bar being rigid throughout its length and inclined rearwardly and downwardly from the steering post, a pair of downwardly and rearwardly inclined and divergent legs rigidly secured to the rear portion of said frame bar at opposite sides of the latter and having their upper ends projecting freely above the said frame bar, a rearwardly projecting arm having its forward end between and pivotally connected to the said upper free ends of said legs, a seat rigidly secured to the forward portion of said arm, an axle journalled through the lower rear ends of the legs and having a crank centrally therebetween, wheels secured upon the ends of said axle, and a connecting rod in pivotal connection with the crank and with the rear end of said seat arm.

PETER P. WETZEL.